United States Patent
Fuller et al.

(10) Patent No.: US 8,245,141 B1
(45) Date of Patent: Aug. 14, 2012

(54) HIERARCHICAL COLLABORATION POLICIES IN A SHARED WORKSPACE ENVIRONMENT

(75) Inventors: Charles E. Fuller, Foster City, CA (US); Deepa Krishnan, Freemont, CA (US)

(73) Assignee: Cisco Technology, Inc., San Jose, CA (US)

(*) Notice: Subject to any disclaimer, the term of this patent is extended or adjusted under 35 U.S.C. 154(b) by 808 days.

(21) Appl. No.: 12/260,778

(22) Filed: Oct. 29, 2008

(51) Int. Cl.
*G06F 3/00* (2006.01)
*G06F 15/173* (2006.01)

(52) U.S. Cl. ........ 715/741; 715/742; 715/743; 709/225; 709/229; 709/223

(58) Field of Classification Search .......... 715/741–743; 709/225, 229, 223
See application file for complete search history.

(56) References Cited

U.S. PATENT DOCUMENTS

| | | | |
|---|---|---|---|
| 6,408,336 B1* | 6/2002 | Schneider et al. | 709/229 |
| 7,010,600 B1* | 3/2006 | Prasad et al. | 709/225 |
| 7,155,534 B1 | 12/2006 | Meseck et al. | |
| 7,177,978 B2 | 2/2007 | Kanekar et al. | |
| 7,236,493 B1 | 6/2007 | McRae | |
| 7,237,267 B2 | 6/2007 | Rayes et al. | |
| 7,249,374 B1 | 7/2007 | Lear et al. | |
| 7,346,677 B1 | 3/2008 | Mohaban et al. | |
| 7,421,503 B1 | 9/2008 | Stieglitz et al. | |
| 7,512,965 B1* | 3/2009 | Amdur et al. | 726/1 |
| 7,877,409 B2* | 1/2011 | Lim | 707/781 |
| 7,962,513 B1* | 6/2011 | Boles et al. | 707/781 |
| 2002/0103661 A1* | 8/2002 | Albazz et al. | 705/1 |
| 2003/0177389 A1* | 9/2003 | Albert et al. | 713/201 |
| 2003/0229812 A1* | 12/2003 | Buchholz | 713/202 |
| 2004/0170172 A1 | 9/2004 | Pullela et al. | |
| 2005/0097440 A1* | 5/2005 | Lusk et al. | 715/500.1 |
| 2005/0262132 A1* | 11/2005 | Morita et al. | 707/102 |
| 2006/0072456 A1 | 4/2006 | Chari et al. | |
| 2006/0074899 A1 | 4/2006 | Enderwick et al. | |
| 2006/0098649 A1* | 5/2006 | Shay | 370/389 |
| 2006/0117058 A1 | 6/2006 | Smith | |
| 2006/0117063 A1* | 6/2006 | Havewala et al. | 707/104.1 |
| 2006/0143440 A1 | 6/2006 | Ponnapalli et al. | |
| 2006/0272003 A1 | 11/2006 | Andreasen | |
| 2007/0226775 A1 | 9/2007 | Andreasen et al. | |
| 2007/0266421 A1* | 11/2007 | Vaidya et al. | 726/1 |
| 2008/0072280 A1* | 3/2008 | Tardo et al. | 726/1 |
| 2008/0091682 A1* | 4/2008 | Lim | 707/9 |
| 2008/0222694 A1* | 9/2008 | Nakae | 726/1 |
| 2008/0313731 A1* | 12/2008 | Iftimie et al. | 726/18 |
| 2009/0171957 A1* | 7/2009 | Havewala et al. | 707/6 |

* cited by examiner

*Primary Examiner* — Tadeese Hailu

(57) ABSTRACT

In one embodiment, a first administrative entity having first members may initiate an operated shared workspace having a policy control engine. The first administrative entity may configure a first set of policies regarding workspace access, while a second administrative entity, having second members, may configure a second set of policies regarding workspace access. The policy control engine may then apply the first policies to the first and second members, and also may apply one or more policies of the second set of policies to the second members in response to the respective policies being stricter than corresponding policies of the first set of policies.

20 Claims, 4 Drawing Sheets

HIERARCHICAL COLLABORATION POLICIES IN A SHARED WORKSPACE ENVIRONMENT

TECHNICAL FIELD

The present disclosure relates generally to shared workspace environments, and, more particularly, to shared resources in online workspace environments.

BACKGROUND

Currently, a virtual/online workspace may be created by a particular administrative entity (e.g., a company), which may impose one or more policies (rules) regulating the content and/or activity (e.g., access) within the workspace. In order for collaboration to occur with clients outside of the administrative entity (e.g., another company), these clients are generally required to use a "guest" account governed by the policies set by the administrative entity. However, these clients may be governed by their own policies, which are not enforced within the workspace of the administrative entity (that is, because the clients are operating as guests of the administrative entity, they are thus governed by the administrative entity's policies instead).

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a first administrative entity having first members may initiate an operated shared workspace having a policy control engine. The first administrative entity may configure a first set of policies regarding workspace access, while a second administrative entity, having second members, may configure a second set of policies regarding workspace access. The policy control engine may then apply the first policies to the first and second members, and also may apply one or more policies of the second set of policies to the second members in response to the respective policies being stricter than corresponding policies of the first set of policies.

DESCRIPTION

Figure 1:
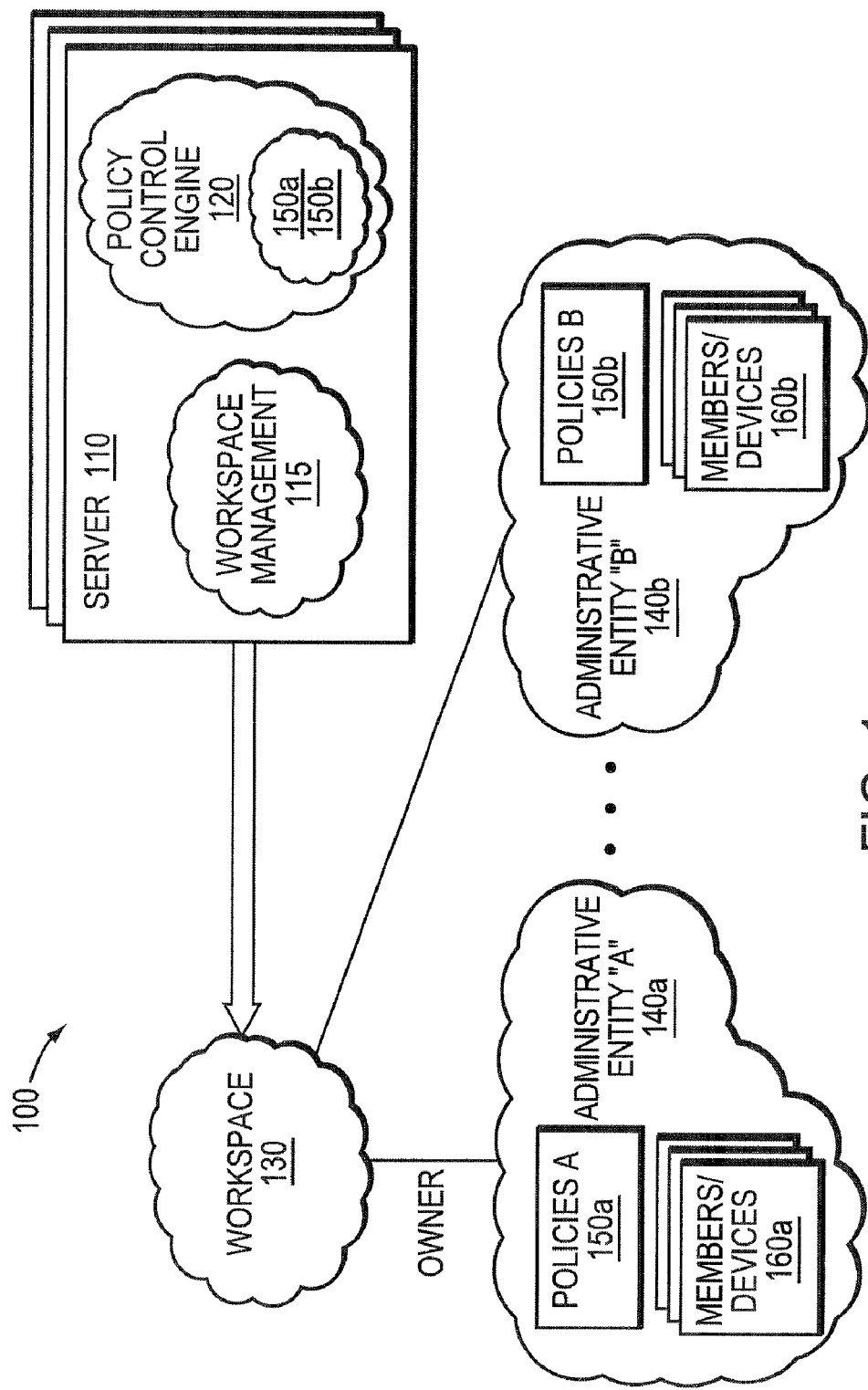
FIG. 1 illustrates an example workspace environment.

FIG. 1 is a schematic block diagram of an example computer network 100 illustratively comprising logical entities, such as one or more servers 110 and one or more administrative entities 140. For instance, within administrative entities may be one or more personal computers (PCs) or one or more peripheral devices, such as phones, etc., corresponding to various members (or "participant devices") 160. Those skilled in the art will understand that any number of nodes, devices, links, etc. may be used in the computer network, and that the view shown herein is for simplicity.

In this environment, a number of participants may interact in an on-line, interactive, or collaborative setting. Such a setting can be for a meeting, training or education, support, or any other event that may require a number of participants to work together, interact, collaborate, or otherwise participate, such as web conferences, on-line meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices through the interaction servers 110. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. In other words, a collaboration session comprises a plurality of devices or "participant devices," of which "attendee devices" are configured to view/receive content submitted or "shared" by "presenter devices." In some instances, the attendee devices are capable of modifying the content shared by the presenter device.

A "workspace" 130, as used herein, generally describes a collection of shared resources (e.g., documents, meetings, services, etc.). In particular, a workspace provides context to the shared resources, such as where online collaborative workspaces allow users to share related documents, communications, and other related objects/events in a type of "virtual meeting room." A virtual meeting room functions logically as a physical meeting rooms, such as where various people may enter and leave the room, there may be different discussions/activities occurring within the room, certain documents are kept in the room, various notes are left on the walls of the room, etc. Workspaces, therefore, provide collaboration services relating to a particular context/project (e.g., the information and topic/subject of the information) in a long-running session (i.e., where the session continues with members entering and leaving the session until the workspace is ended). Notably, a user may be a member of a plurality of particular spaces, and may be "located" (e.g., currently working within) in a particular workspace at any given time.

An online workspace comprises various applications/services, such as file and file sharing applications (e.g., shared desktops, shared applications), discussion and communication applications (e.g., one-on-one discussions, instant messaging or "IM" applications, phone calls, shared video sessions), various "widgets" (e.g., bulletin boards, URL listings, bookmarks, Web 2.0 services, etc.), all with the context provided of being within the same workspace (e.g., regards the same subject). Advanced context may also be provided within a workspace, going beyond merely organizing files and hosting communications. For instance, document "tagging" (as will be understood by those skilled in the art) provides document relations and searchability. In addition, workspaces provide a central depository for storing documents, voice recordings, notes, chat sessions, emails, images, video recordings, presentations, URLs, etc., all with interrelations, additional context (e.g., "members had a discussion about this document on this date, and these follow up emails occurred between these members, one of which included this URL," etc.).

In other words, workspaces help organizations/companies to accelerate business processes by combining web meetings with a persistent, shared online workspace to centralize information, manage communication, and maximize team collaboration. Team members from different departments and companies may work together, across disparate time zones, locations, and computing systems. In particular, workspaces provide a centralized and searchable repository to easily share documents and information, and also provide version tracking to maintain document history and keep members of the workspace aware of the latest versions. (An illustrative workspace environment is the WebEx Workspace, available from WebEx Communications, Inc., of Santa Clara, Calif.)

Each participant/member of a workspace (or online collaboration session) may operate a participant device 160, which may comprise an electronic device with capability for visual and/or auditory presentation. Thus, a participant device can be, for example, a desktop personal computer (PC), a laptop computer, a workstation, a personal digital assistant (PDA), a wireless telephone, a smart phone, an Internet television, and the like. Each participant device supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network such as, for example, the Internet, and may appear as a client computer thereon.

In one embodiment, each participant device 160 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to workspaces and/or on-line, interactive meeting (a collaborative computing session), such as conventional web browser programs that allow convenient access and navigation of the Internet (e.g., the World Wide Web).

The workspace 130 (shared resources/collaborative computing session) of the various participants may be supported by one or more servers 110, which may be maintained or operated by one or more of the participants and/or a third-party service provider. The servers 110 may be a computer system that is connected to the network, and may store information (e.g., content) and application modules which can be provided to the participant devices 160. In some embodiments, these application modules are downloadable to the participant devices and may support various functions that may be required for an interactive meeting or collaborative effort among the participants (e.g., workspaces 130).

The network 100 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
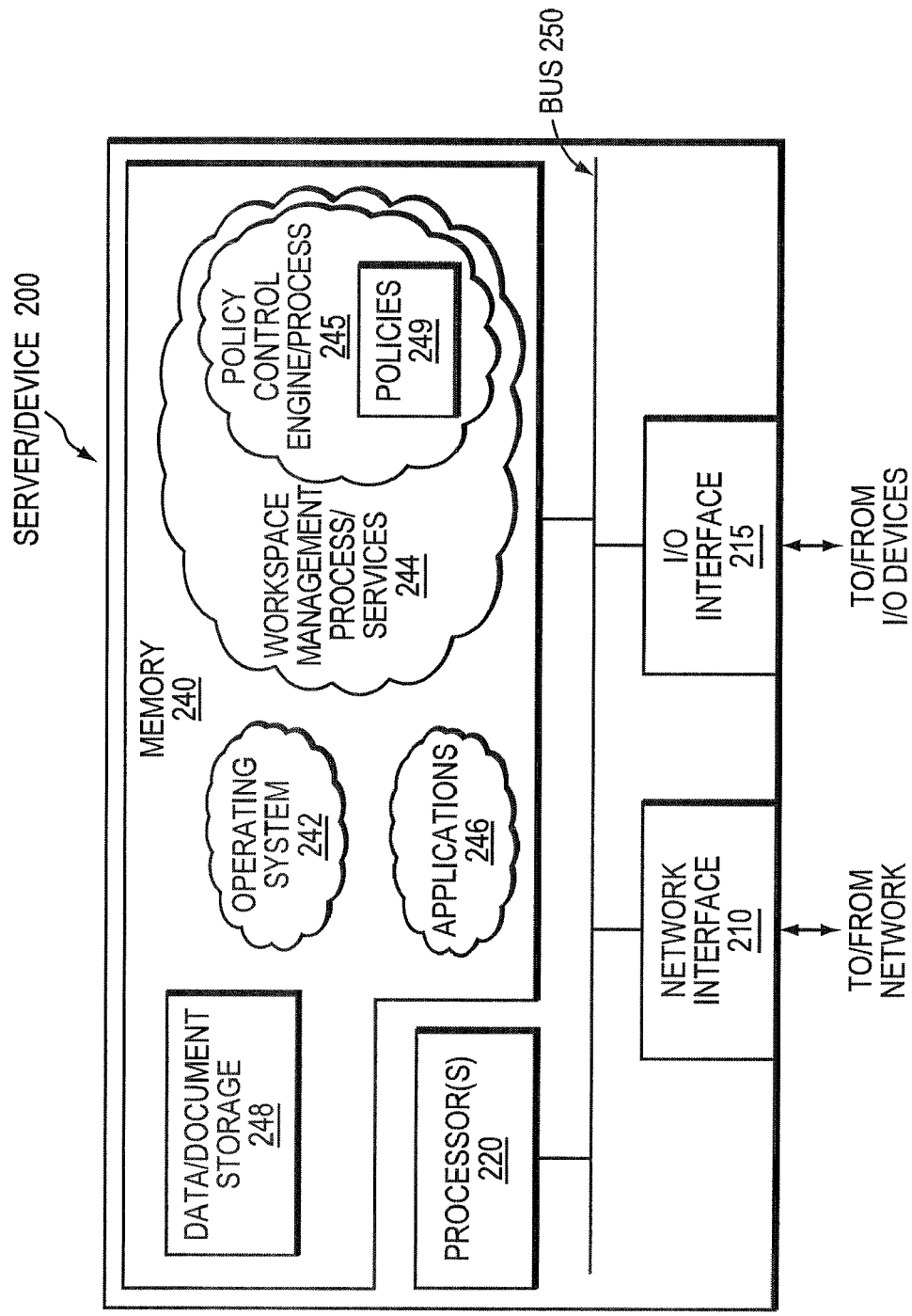
FIG. 2 illustrates an example device.

FIG. 2 illustrates a schematic block diagram of an example device 200 that may be advantageously used with one or more embodiments described herein, e.g., as a server 110. Illustratively, device 200 may be implemented or incorporated in any suitable computer such as, for example, a mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 100. The network interface(s) may be configured to transmit and/or receive data using a variety of different communication protocols suitable for the network, and may communicate with other network-attached devices. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. The processor(s) 220 may comprise necessary elements or logic adapted to execute the software programs and manipulate the data structures, such as data/document storage 248. An operating system 242, portions of which are typically resident in memory 240 and executed by the processor(s), functionally organizes the device by, inter alia, invoking operations in support of software processes and/or services executing on the device (e.g., for workspaces as used herein). In particular, these software processes and/or services may comprise one or more applications 246, and, in particular, a workspace management process 244, along with a policy control engine/process 245. It will be apparent to those skilled in the art that other types of processors and memory, including various computer-readable media, may be used to store and execute program instructions pertaining to the inventive technique described herein.

Workspace management process/services 244 (e.g., management 115 of FIG. 1) may contain computer executable instructions executed by the processors 220 to generally perform functions to manage or control various processes or aspects during the operation of a workspace 130. Particularly, in the context of on-line meetings/workspaces, for example, workspace management process 244 may manage workspace-related actions, such as data/document storage (e.g., 248) and management (e.g., collaborative editing), document linking, database management, workspace visualization displays, collaboration services (e.g., telephone, VoIP, video, chat, IM, etc.), a basic communication framework, file sharing (e.g., for text, images, video, audio), user authentication, meeting scheduling, address books, files and folders, invoices, billing, scheduling, word processing, application sharing, accounting, and other actions as may be appreciated by those skilled in the art, and in accordance with the novel techniques described herein.

For instance, illustrative modules of workspace management process 244 may comprise a document manager (e.g., to securely share documents, files, and other content that are of common interest to members of the workspace, including remote workers, customers, suppliers, and business partners), an online calendar (e.g., to coordinate group meetings, get automatic meeting reminders, sync meetings with multiple devices, and start web meetings, or to keep track of workspace member availability, group meetings and events), an online meeting manager (e.g., to allow members to meet online, in real-time secure meetings with customers and colleagues, to give presentations, demonstrate products, conduct training, etc.), a task manager (e.g., to organize personal and project-related tasks, monitor task status, track project progress, and provide updates to members of the workspace), database services, email/communications services, etc.

A policy control engine process 245 (e.g., engine 120 of FIG. 1) supports policy-based management services for workspaces 130, such as through authentication of users/members 160, document control, activity management, permissions, etc. For instance, basic policy control comprises simple security measures, such as authenticating a user for a particular workspace (who is allowed to participate/share resources). More advanced policies involve restricting various activities and interactions, such as who may access/control documents or who may collaborate with whom. (Further examples of policies may be found below, with reference to the embodiments described herein.)

As noted above, workspaces 130 may currently be created by a particular administrative entity (e.g., company A 140a), which may impose one or more policies regulating the content and/or activity (e.g., access) within the workspace. In order for collaboration to occur with members/users outside of the administrative entity (e.g., another company B 140b), these users are generally required to use a "guest" account governed by the policies set by the administrative entity 140a. However, the members of the other entity 140b may also be governed by their own policies, which are not enforced within the workspace 130 of the company A. Specifically, since the members 160b of company B are operating as guests of company A, they are thus generally governed by company A's policies.

According to the embodiments of the disclosure, therefore, hierarchical collaboration policies may be used to allow coexistence of individual policies (e.g., from multiple administrative entities or organizations) governing clients/users having access to a shared resource, such as a shared online collaboration workspace. Illustratively, certain techniques described herein may be performed by policy control engine/process 245 (120), or by various applications 246 configured to cooperate with the policy control engine/process 245, accordingly.

Operationally, a shared workspace 130 (or other shared resource) may be established or initiated by a first administrative entity "A" 140a, such as a particular company (hereinafter "company A") for use by users under its administration (e.g., its employees). For example, company A may wish to share this workspace with another administrative entity "B" 140b, such as another company (e.g., "company B") having its own employees/users. Notably, a user who is given access to a workspace may be referred to as a "member" of the workspace. Further, operation of the workspace 130 may be managed by the servers 110 (workspace management 244), along with an associated policy control engine 120 (245).

Illustratively, company A may set (establish) one or more policies (rules) regarding the workspace 130 and workspace access as well as company A's employees/members within the particular workspace (and/or within all workspaces in general). For instance, company A may configure a policy dictating that no documents within the workspace may be deleted by employees outside of company A. Also, company A may allow its employees to upload documents to the particular workspace. These policies (150a) may be transmitted and then received by the policy control engine, to be stored and managed within a policies table/module 249.

Figure 3:
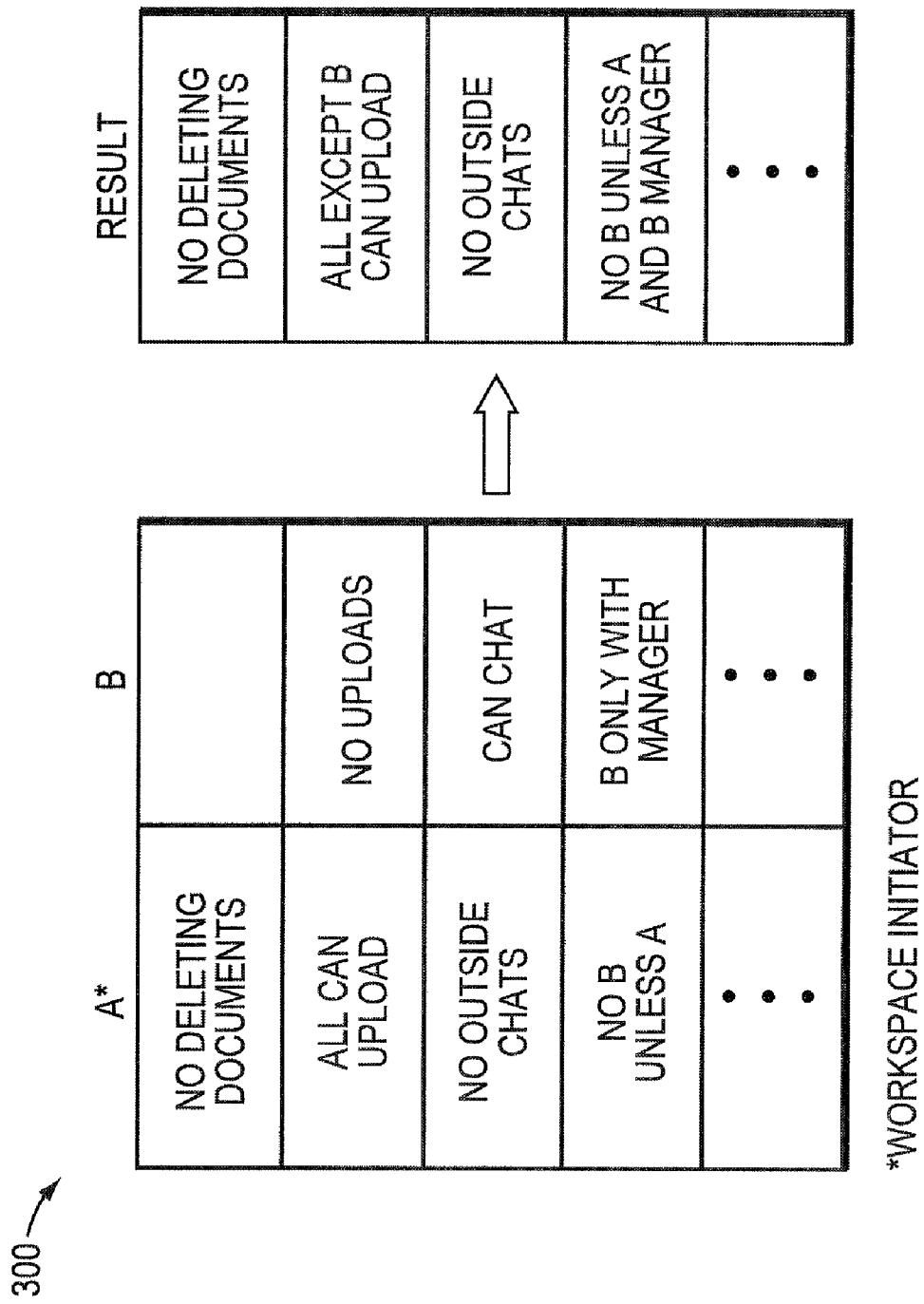
FIG. 3 illustrates an example policy logic.

For instance, FIG. 3 illustrates an example policy logic 300 based on the techniques described herein that may be utilized by policy control engine/process 120/245 for storing and administering policies 249 for a workspace 130. (Those skilled in the art will understand that policy logic 300 is merely for illustrative purposes for the reader, and is not meant to illustrate the actual storage/maintenance of policies on a device.)

Policies, in general, may be any type of rule that may be applied to grant or limit access to a particular shared resource, such as a workspace. Policies may be used to define what actions may be taken by whom, when, how often, etc. For example, company A may configure a first set of policies that specifically define workspace access for its members, workspace access for members other than its members (e.g., anyone other than company A's employees), or workspace access for specific outside members (e.g., specific access for company B's employees). Illustrative policies may comprise, inter alia, document access (who can access/see a document/file, when, etc.), document control (who can open, edit, delete, move, etc.), feature set availability (which actions or applications are available to whom, when, for how long, etc., for example, calendar visibility, tasks, application modules or "widgets", receipt of notifications/alarms, etc.), folder control (which documents or files in a certain folder are off-limit to guests or users outside of a particular entity) and interaction between members (who can chat with whom, who can send/share documents to/with whom, etc.).

Assume, for example, as shown in FIG. 3, that company A defines the following policies: no documents may be deleted; all members can upload documents; no members may have a chat session with members of another company; and no members of company B may be present in the workspace without a member from company A.

Company B, on the other hand, may have its own set of configured policies 150b in place for its members 160b, such as general workspace policies, and policies specific to the workspace 130 initiated by company A. For instance, company B may generally dictate that any member of company B can chat (establish a chat session) with any other member of a workspace, and, specific to the particular workspace 130, company B may define policies that no member from company B can upload any documents to the workspace, and that no member from company B may be in the workspace without a manager from company B being in the workspace (e.g., for restrictions on lower-level employees in a sensitive workspace). (Note, again, that the policies mentioned herein are merely representative examples, and are not meant to limit the embodiments herein.)

With prior techniques, company B's employees/members would have needed to establish a guest account of company A in order to access company A's workspace 130. As such, company B's employees would not be prevented from uploading documents to the workspace according to company B's policies, since the guest account is controlled under company A's policies. According to the embodiments described herein, therefore, the policy control engine/process 120/244 may apply company A's policies (the administrative entity having established the workspace) to all members of the workspace, and may advantageously apply company B's policies (or any other company's or entity's policies) to company B's members (or respective other company's members) in response to company B's policies being stricter than company A's policies.

A stricter policy, in general, is a policy that is more limiting than another policy, at least in some manner. Accordingly, a stricter policy need not take the place of a less strict policy, but instead may be merged/combined with the less strict policy. For example, referring to FIG. 3, the resultant hierarchical collaboration policies may be as shown. For instance, where company A has restricted any member from deleting a document, and company B has not configured any related policies, the result is that no documents may be deleted from the workspace. Also, where company A has granted access to all members to upload documents, but company B has restricted its members from doing so, then the result is that all members other than company B's may upload documents to the workspace, thus merging the policies.

Further, as shown in the example, company A has mandated that no inter-company chat sessions may be held, yet company B has specifically allowed all chat sessions. Since company A has initiated the workspace, company A's policies govern all of company A's members, but if more strict than another company's policies, also govern members of the other company. Accordingly, the resultant policy is that no outside (inter-company) chat sessions may be held by anyone, even between company B's employees and another company's employees.

Lastly, as shown in the example, company A requires that one of its members be present in order for a company B member to access the workspace, and company B limits member access to when a manager is present. As such, the resultant policy may be to only allow company B members to access the workspace when a member from company A and a manager from company B are there. (Again, policy logic 300 is merely illustrative, and these two policies may be maintained as separate policies both applied, or as a merged policy as shown. Those skilled in the art will appreciate the many ways in which a policy engine may apply corresponding policies, where the techniques described herein define their hierarchical arrangements and application.)

According to the techniques described herein, therefore, company B employees/members can now join company A's workspace directly, and still be governed by both company A's applicable policies (e.g., no deleting of documents within workspace) and company B's more strict applicable policies (e.g., no uploading documents to the workspace).

Note that company B's policies should not generally be able to dictate access of company A's members (unless allowed to do so by company A), since company A is the administrative entity that established the workspace. For example, company B should not be able to configure a policy that says no members of company A may transmit a document to members outside of company A. Rather, company B, with control over its own employees, may configure a policy that says no members of company B may receive a document from members of company A.

Figure 4:
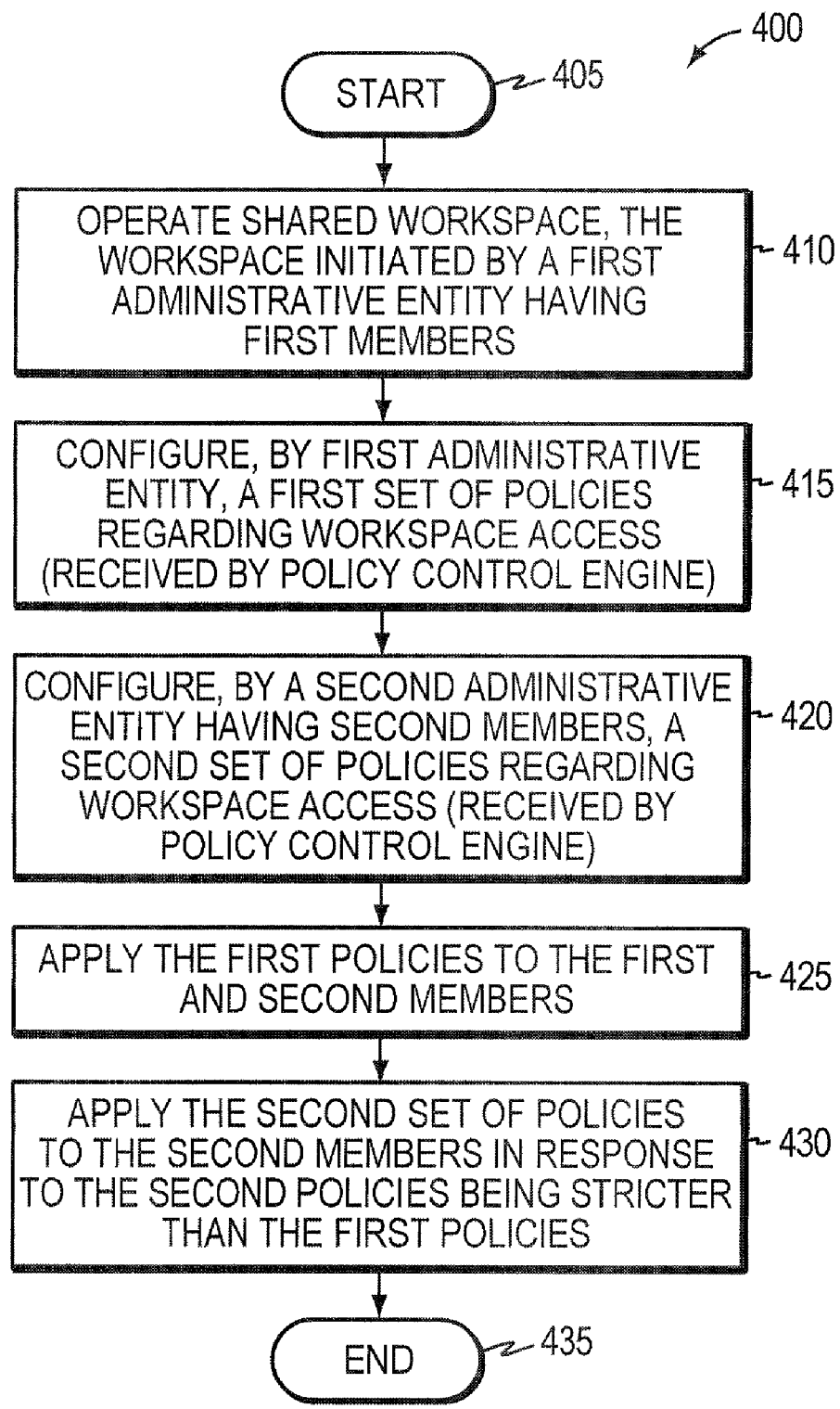
FIG. 4 illustrates an example procedure for managing hierarchical collaboration policies in a shared workspace environment.

FIG. 4 illustrates an example procedure for managing hierarchical collaboration policies in a shared workspace environment in accordance with one or more embodiments described herein. The procedure 400 starts at step 405, and continues to step 410, where a shared workspace 130 may be operated having a policy control engine 120/245, where the workspace was initiated by a first administrative entity 140a having first members 160a. In step 415, the first administrative entity may configure a first set of policies 150a regarding workspace access (which is received by the policy control engine), and in step 420 a second administrative entity 140b having second members 160b may configure a second set of policies 150b regarding workspace access (also received by the policy control engine).

During operation/management of the shared workspace, the policy control engine may then accordingly apply, in step 425, the first policies to the first and second members as described above, and in step 430, may apply the second set of policies to the second members in response to the second policies being stricter than the first policies, as also described above (that is, applying one or more policies of the second set of policies to the second members in response to the respective policies being stricter than corresponding policies of the first set of policies). The procedure 400 ends in step 435, such as where the workspace is no longer operational. Notably, though the steps of FIG. 4 are shown in an illustrative order, the embodiments herein are not so limited, and any logical order may be performed. For instance, during operation of a workspace, policies may be repeatedly changed by either entity, and the policy engine continually applies both sets of policies, accordingly.

Advantageously, the novel techniques described herein manage hierarchical collaboration policies in a shared workspace environment. By configuring a policy control engine as described, the novel techniques allow for different administrative entities to define access control for members within the workspace. In particular, the techniques described above create effective hierarchical collaboration policy control that allows administrative entities control over their workspace and/or their members, and alleviates the concerns with guest accounts as noted.

While there have been shown and described illustrative embodiments that manage hierarchical collaboration policies in a shared workspace environment, it is to be understood that various other adaptations and modifications may be made within the spirit and scope of the present invention. For example, the embodiments have been shown and described herein for use with an online collaboration session as the workspace environment. However, the embodiments of the invention in their broader sense are not so limited, and may, in fact, be used with any "shared resource." For instance, the policy control engine may be a room access control system, such as for access passes within physical building locations.

For example, assume that company A allows members of any company to access only certain floors of company A's building, but a company B would like to restrict access to certain of its employees to particular areas (e.g., access only to necessary conference rooms). According to the techniques described above, therefore, company B's employees/members may be granted access to certain floors according to company A's policies (e.g., door passes, elevator passes, etc.), but only to unlocked rooms on those floors or certain conference rooms (e.g., those that are acceptable based on B's policies). Those skilled in the art will appreciated that this example is merely representative, and is not meant to limit the scope of the embodiments described herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
operating a shared workspace, the workspace initiated by a first administrative entity having first members and a first set of policies regarding workspace access, the workspace shared with a second administrative entity having second members and a second set of policies regarding workspace access;
applying the first policies to the first and second members; and
applying one or more policies of the second set of policies to the second members in response to the respective policies of the second set of policies being stricter than corresponding policies of the first set of policies, wherein the second set of policies is inapplicable to the first members and workspace access for the first members is controlled by the first set of policies, and wherein workspace access for one or more second members is controlled by both the first and second sets of policies.

2. The method as in claim 1, wherein the first set of policies define workspace access for the first members.

3. The method as in claim 1, wherein the first set of policies define workspace access for non-first members other than the first members.

4. The method as in claim 3, wherein the first set of policies specifically define workspace access for the second members.

5. The method as in claim 1, wherein the first set of policies define interaction ability between the first members and non-first members.

6. The method as in claim 5, wherein the first set of policies define interaction ability between the first members and second members.

7. The method as in claim 1, wherein the workspace is a set of shared resources of an online collaboration session.

8. The method as in claim 7, wherein the first and second sets of policies define workspace access to at least one of: document access; document control; feature set availability; folder control; and interaction between members.

9. The method as in claim 1, wherein the workspace is a physical building location with room access control.

10. An apparatus, comprising:
one or more network interfaces adapted to communicate with network-attached devices;
a processor coupled to the network interfaces and adapted to execute one or more processes; and
a memory configured to store a policy control process executable by the processor, the policy control process when executed operable to:
manage operation of a shared workspace, the workspace initiated by a first administrative entity having first members;
receive a first set of policies from the first administrative entity regarding workspace access;
receive a second set of policies from a second administrative entity regarding workspace access, the second administrative entity having second members;
apply the first policies to the first and second members; and
apply one or more policies of the second set of policies to the second members in response to the respective policies of the second set of policies being stricter than corresponding policies of the first set of policies, wherein the second set of policies is inapplicable to the first members and workspace access for the first members is controlled by the first set of policies, and wherein workspace access for one or more second members is controlled by both the first and second sets of policies.

11. The apparatus as in claim 10, wherein the first set of policies define workspace access for the first members.

12. The apparatus as in claim 10, wherein the first set of policies define workspace access for non-first members other than the first members.

13. The apparatus as in claim 12, wherein the first set of policies specifically define workspace access for the second members.

14. The apparatus as in claim 10, wherein the first set of policies define interaction ability between the first members and non-first members.

15. The apparatus as in claim 14, wherein the first set of policies define interaction ability between the first members and second members.

16. The apparatus as in claim 10, wherein the workspace is a set of shared resources of an online collaboration session.

17. The apparatus as in claim 16, wherein the first and second sets of policies define workspace access to at least one of: document access; document control; feature set availability; folder control; and interaction between members.

18. The apparatus as in claim 10, wherein the workspace is a physical building location with room access control.

19. A system, comprising:
a first administrative entity having first members;
a second administrative entity having second members;
one or more servers configured to operate a shared workspace, the workspace initiated by the first administrative entity; and
a policy control engine to:
manage operation of the shared workspace;
receive a first set of policies from the first administrative entity regarding workspace access;
receive a second set of policies from the second administrative entity regarding workspace access;
apply the first policies to the first and second members; and
apply one or more policies of the second set of policies to the second members in response to the respective policies of the second set of policies being stricter than corresponding policies of the first set of policies, wherein the second set of policies is inapplicable to the first members and workspace access for the first members is controlled by the first set of policies, and wherein workspace access for one or more second members is controlled by both the first and second sets of policies.

20. The system as in claim 19, wherein the workspace is a set of shared resources of an online collaboration session.

* * * * *